(12) United States Patent
Whaley

(10) Patent No.: US 7,086,622 B1
(45) Date of Patent: Aug. 8, 2006

(54) FISHING REEL WINDING ARM ADAPTER FOR WINDING A FISHING LINE

(76) Inventor: William R. Whaley, 210 NW. 27th Ter., Fort Lauderdale, FL (US) 33311

( * ) Notice: Subject to any disclaimer, the term of this patent is extended or adjusted under 35 U.S.C. 154(b) by 0 days.

(21) Appl. No.: 10/905,700

(22) Filed: Jan. 18, 2005

(51) Int. Cl.
*A01K 89/01* (2006.01)

(52) U.S. Cl. ...................... 242/323; 242/250
(58) Field of Classification Search ........ 242/225–227, 242/250, 251, 257, 323; 43/21
See application file for complete search history.

(56) References Cited

U.S. PATENT DOCUMENTS

| | | | |
|---|---|---|---|
| 3,126,166 A | 3/1964 | Weinberg | |
| 4,951,890 A | 8/1990 | Sossamon | |
| 4,962,901 A | 10/1990 | Shirley et al. | |
| 5,397,071 A | 3/1995 | Nanbu | |
| 5,556,047 A | 9/1996 | Nanbu | |
| 5,603,489 A * | 2/1997 | Regal | 254/378 |
| 6,126,104 A | 10/2000 | Kellerman | |
| 6,457,665 B1 | 10/2002 | Koehler et al. | |
| 6,550,712 B1 * | 4/2003 | Peterpaul | 242/390.8 |
| 6,685,125 B1 * | 2/2004 | Tucci | 242/390.8 |

\* cited by examiner

*Primary Examiner*—Emmanuel M Marcelo
(74) *Attorney, Agent, or Firm*—Malin, Haley & DiMaggio, P.A.

(57) ABSTRACT

This invention relates to an article of manufacture, and specifically to a fishing reel winding arm adapter for winding line onto a fishing reel spool using a high-carbon plastic cylindrical body with an attached drive member that allows an electric screwdriver to be interconnected with the winding arm of the fishing reel to eliminate the need for manual winding of line onto a fishing reel spool, thereby saving time.

12 Claims, 3 Drawing Sheets

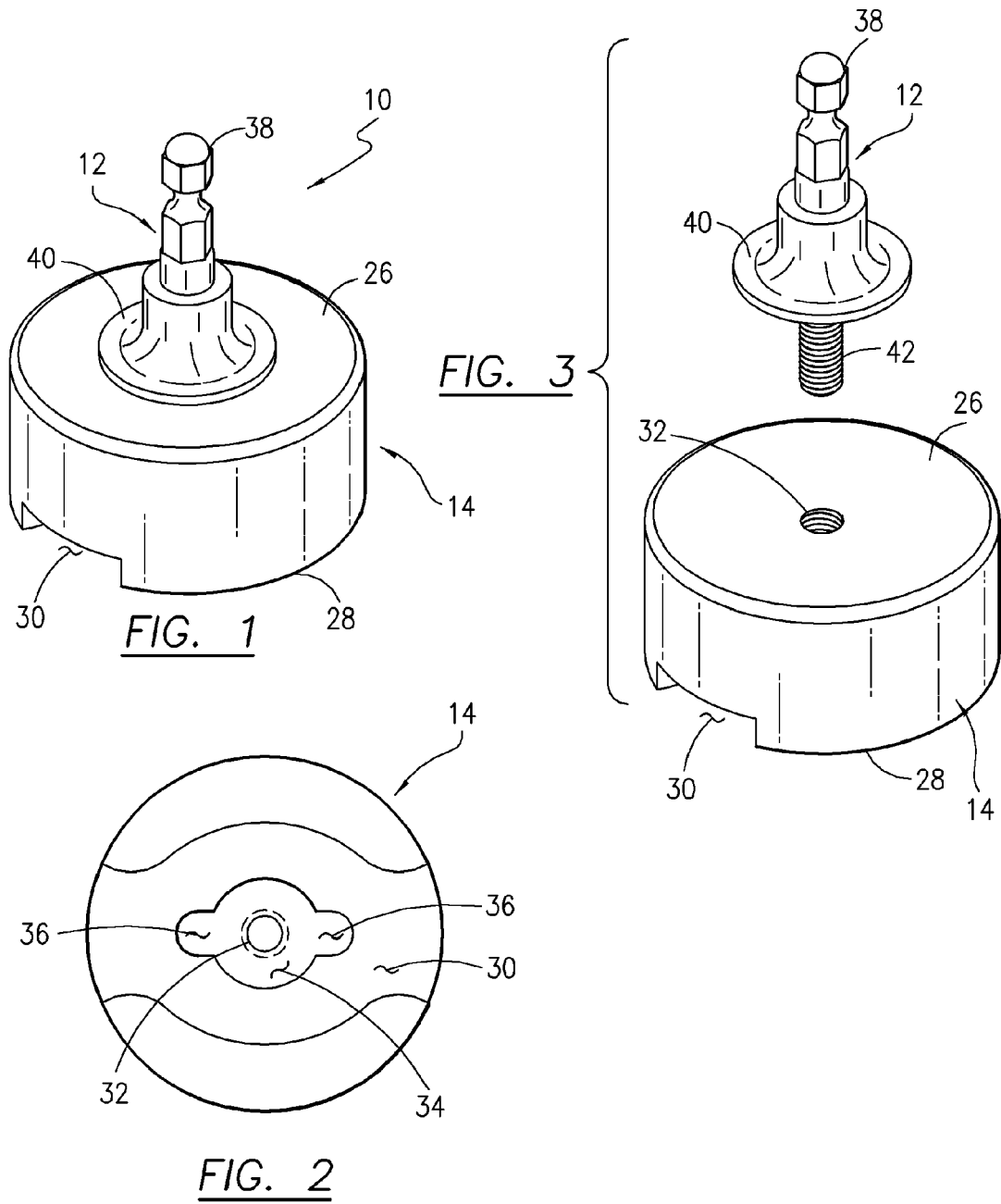

FISHING REEL WINDING ARM ADAPTER FOR WINDING A FISHING LINE

FIELD OF THE INVENTION

This invention relates generally to an article of manufacture useful for automated winding of a fishing line onto a fishing reel to eliminate the need for manual winding and, specifically, to an adapter for automatically winding line onto a fishing reel spool using a high-carbon plastic body with a recessed end and a drive member, which allow an electric screwdriver to be interconnected to the winding arm of the fishing reel.

DESCRIPTION OF RELATED ART

Numerous fishing reels of various designs are currently available on the market, none of which has a device for quickly and efficiently winding new line onto the spool of the reel. Generally, new fishing line is wound onto a regular casting fishing reel spool in the same manner as line cast from a spinning reel is retrieved, i.e. by manual operation of a hand crank or handle. Winding new line onto the spool of a fishing reel manually is tiresome, time-consuming, and otherwise inefficient. Fishing line has to be replaced periodically when it becomes worn and many fishermen change the type of line on the reel depending upon the type of fish they intend to catch. Therefore, the process of manually winding line onto a fishing reel is often tedious and frustrating due to the amount of time required to complete the task.

U.S. Pat. No. 6,457,665, issued to Koehler et al., on Oct. 1, 2002, describes a fly reel loader that simplifies loading line onto a fly reel by engaging the spool and rotating it in the desired direction using an electric screwdriver. However, this device cannot be used to load line onto the spool of a casting or spinning reel. Another device, described in U.S. Pat. No. 6,126,104, issued to Kellerman on Oct. 3, 2000, comprises an adapter for interconnecting a cordless electric screwdriver and a fishing reel, the installation of which requires removal and replacement of the winding arm on the fishing reel to attach the reel shaft and gear combination apparatus.

Another prior art patent reference describes a drive member for a fishing reel that includes a threaded portion for installation onto the crank shaft of a fishing reel. U.S. Pat. No. 4,962,901, issued to Shirley et al., on Oct. 16, 1992. The opposite end of the apparatus has a cross section for inserted engagement with an electric screwdriver that powers the loading of the line onto the reel. An electric motor drive for a fishing reel is also described in U.S. Pat. No. 3,126,166, issued to Weinberg on Mar. 24, 1964. The power source in that invention can be supplied either by a battery combined with the motor or from a power cord connection terminating with a plug that can be engaged with a power source. Both the U.S. Pat. Nos. 4,962,901 and 3,126,166 are intended to be used while fishing to retrieve line that has been cast out from the fishing reel. Neither of these inventions uses a high carbon plastic for construction of the devices, and therefore, these two inventions are subject to significant wear and/or corrosion. In addition, the inventions described in these patents require the removal of the fishing reel's winding arm to allow engagement with the drive member.

Another patented invention describes a drill-operated adapter for unwinding fishing line neatly onto a cylindrical beverage container so that the line can be discarded. U.S. Pat. No. 4,951,890, issued to Sossamon on Aug. 28, 1990. This device is useful only for removing line from a fishing reel and not for winding line onto a reel. U.S. Pat. No. 5,397,071, issued to Nanbu on Mar. 14, 1995, and 5,556,047, issued to Nanbu on Sep. 17, 1996, describe two patents in the prior art for a motor-operated fishing reel in which the speed of winding up the line can be varied by adjustment of a motor output regulator. Significant shortcomings in these two inventions are attributable to their bulkiness and to the necessity of having an external battery connected to the reel body by a power supply cord in order to start the spool motor and controller of the motor-operated reel.

While the prior art describes several inventions used to retrieve line to be wound onto the spool of a fishing reel once that line has been cast, there are presently no devices that have been created for the purpose of winding new line onto a fishing reel. The present invention allows the user to quickly and efficiently wind new line onto a fishing reel spool when old worn line must be discarded and also to rapidly change the type of line, insofar as the use of different line sizes may be warranted. Furthermore, unlike devices described in the prior art, this invention can be connected directly to an electric-powered screwdriver and to the fishing reel winding arm without dismantling parts of the reel, such as the winding arm.

SUMMARY OF THE INVENTION

A fishing reel winding arm adapter for connecting an electric screwdriver to the fishing reel winding arm of the fishing reel spool to allow automatic winding of the fishing line onto the spool by turning on power to the screwdriver.

The adapter is constructed of a rigid, somewhat cylindrically-shaped body that includes a first end face and a second end face. The first end face is planar and has a centrally-positioned threaded hole for receiving a drive member. The drive member has a hexagonal shank for engaging the chuck of an electric screwdriver. The second end face of the adapter at the opposite end of the cylindrical body includes a recessed channel that is sized and shaped in configuration to receive all or part of the winding arm that is attached to the spool on the fishing reel without removing or changing the configuration of the winding arm for direct contact and connection to said second end face of the adapter. The recess of the second end face provides a very snug fit with the winding arm of the fishing reel.

Once the adapter is engaged at said first end face with a portable, electric screwdriver typically with variable speed and torque actuated by a trigger and at said second end face with the fishing reel winding arm, the user can then begin installing fishing line on the fishing reel spool by actuating the trigger on the electric screwdriver at a usable, variable speed of rotation of the spool, thereby automatically winding the line onto the fishing reel spool.

The adapter body can be constructed from a durable plastic, metal or other desirable lightweight, rigid material to accomplish the interconnection between the drive shaft of the electric screwdriver and the winding arm of the fishing reel. Since most electric powered screwdrivers can rotate in either direction depending upon the selection of direction on the screwdriver using a switch, the user can also expel line quickly from a fishing reel as well as install line on the reel.

An object of this invention is to provide an inexpensive device that effectively decreases the time to load line onto the spool of a fishing reel by eliminating the need to manually wind the reel for installation.

Another object of this invention is to provide a device that is both lightweight and portable such that the device may be taken and used on fishing expeditions.

Yet another object of this invention is to provide an adapter that can be used with a conventional electric-powered screwdriver and with many different models of fishing reels, and that can be used simply and without the need for adjustments or removing parts of the reel.

Still another object of this invention is to provide a device that is corrosion-resistant and can be used for both freshwater and saltwater fishing.

In accordance with these and other objects which will become apparent hereinafter, the instant invention will now be described with particular reference to the accompanying drawings.

BRIEF DESCRIPTION OF THE DRAWINGS

FIG. 1 shows a perspective view of the invention.
FIG. 2 shows a bottom view of the invention.
FIG. 3 shows an exploded view of the invention.

DETAILED DESCRIPTION

Figure 4:
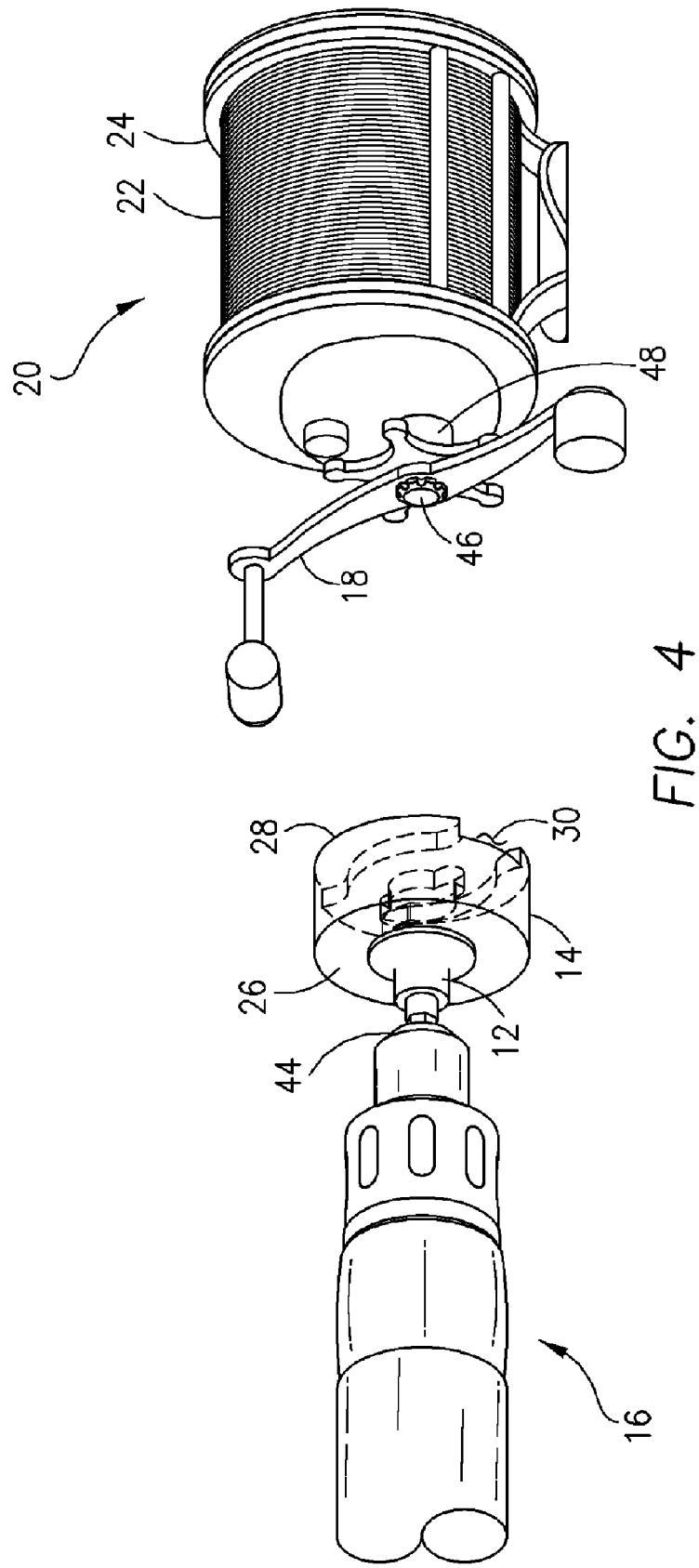
FIG. 4 shows an exploded view of the adapter, electric screwdriver, and winding arm of the fishing reel before these components are coupled together to begin winding line onto the spool of the said reel.

FIG. 1 shows the fishing reel winding arm adapter 10 comprising a drive member 12 and a rigid, cylindrical body 14 that is sized and shaped to be manually interconnected between a cordless battery-powered electric screwdriver 16 and a winding arm 18 of a fishing reel 20 so that a roll of fishing line 22 can be automatically wound onto a spool 24 of said fishing reel. The polycarbon, rigid cylindrical body 14 has a planar first end face 26 and a second end face 28 having a recessed band 30 cut into its surface. Said first end face 26 of the cylindrical body 14 has a centered threaded hole 32 which extends entirely through said cylindrical body to the surface of the second end face 28 of said cylindrical body. High carbon plastic materials are used for construction of the cylindrical body 14 to provide high strength, durability, and wear resistance to the adapter 10. The recessed band 30 on the second end face 28 of the cylindrical body 14 is shallow and extends across the width of said second end face as illustrated in FIG. 2. At the center of the cylindrical body 14 and within the recessed band 30 of the second end face 28, a circular recess 34 with two smaller semicircular recesses 36 on either end are present inside the recess 30 of the second end face of the cylindrical body. Said circular recess 34 is centered over the threaded hole 32 that extends through the cylindrical body 14 of the adapter 10 from the first end face 26 to the surface of the second end face 28.

The drive member 12 of said adapter 10 comprises a shank 12 having a hexagonal end portion 38 and also having a washer 40 welded circumferentially around and above a threaded end 42 of said shank. The hexagonal end portion 38 of the shank 12 can be inserted into a hexagonal socket or chuck 44 of the cordless electric screwdriver 16. The washer 40 welded around the shank 12 provides stability to said drive member 12 once said drive member is connected to the cylindrical body 14. Preferably, the threaded end 42 of the drive member 12 is screwed into the threaded hole 32 on the planar first end face 26 of the cylindrical body 14 until the washer 40 welded to said drive member is flush with the planar surface of said first end face. However, in another embodiment of the invention, said drive member may be constructed without a threaded end so that the drive member is molded onto the cylindrical body. FIG. 3 shows an exploded view of the cylindrical body 14 and the drive member 12.

Figure 5:
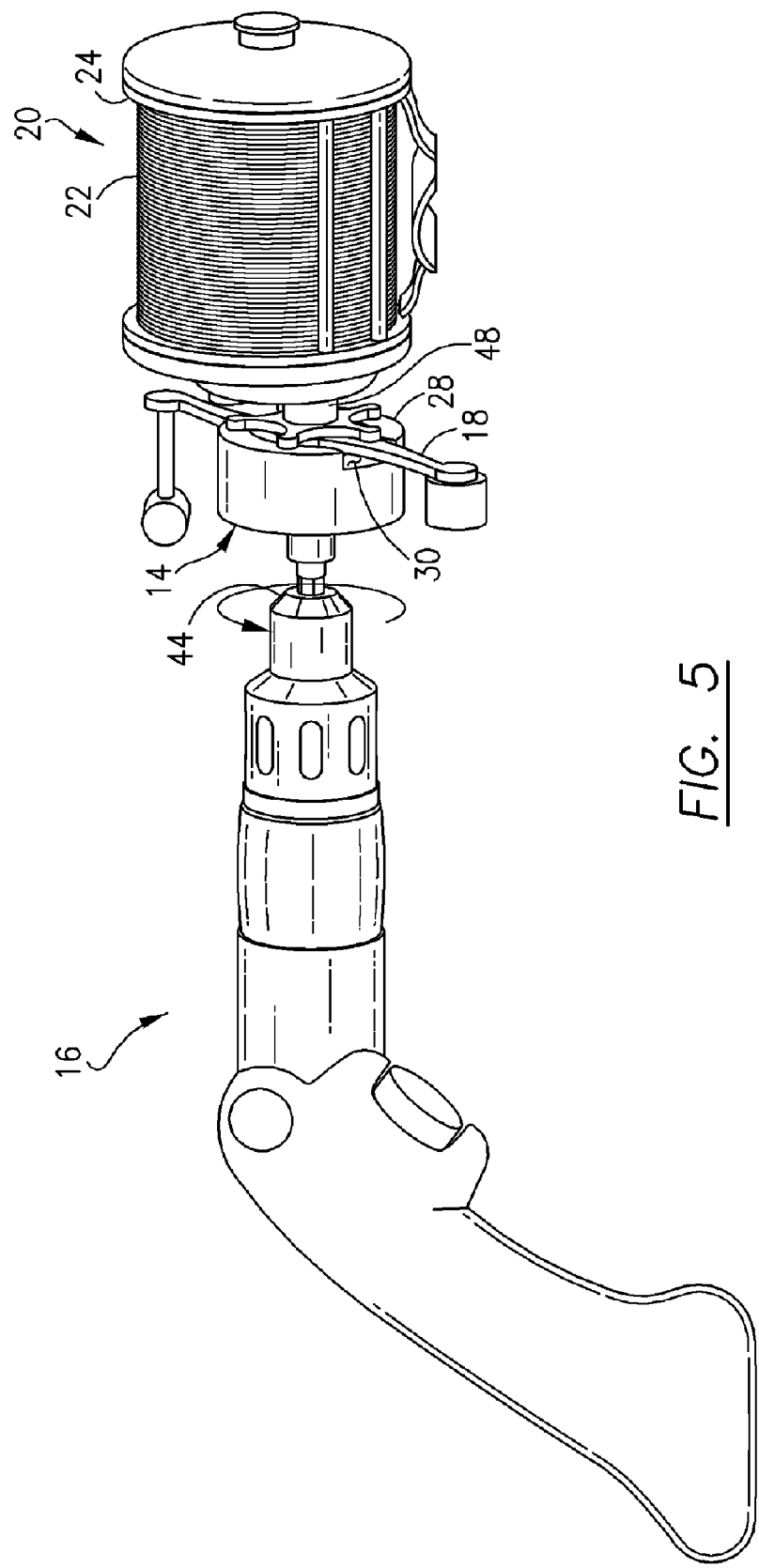
FIG. 5 shows a side view of the invention interconnected between the winding arm of a fishing reel and a portable electric screwdriver.

To use the adapter 10, the circular recess 34 on the second end face 28 of the cylindrical body 14 is aligned with a nut 46 attached to a drive shaft 48 of the fishing reel 20 where said drive shaft connects with the winding arm 18 of the fishing reel. The circular recess 34 and semicircular recesses 36 in the recessed band 30 of the second end face 28 of the cylindrical body 14 are fitted snugly over the winding arm 18 of the fishing reel 20. In particular, the semicircular recesses 36 fit over a stabilizing pin, if present, on the winding arm 18 of the reel 20. FIG. 4 shows an exploded view of the adapter 10, electric screwdriver 16, and winding arm 18 of the fishing reel 20 before these components are coupled together to begin winding line 22 onto the spool 24 of the said reel. Referring to FIG. 5, the chuck 44 of an electric screwdriver 16 is inserted over the hexagonal end portion 38 of the drive member 12. Once the electric screwdriver 16, adapter 10, and winding arm 18 are interconnected, the electric screwdriver trigger is activated to variably spin the drive member 12 and cylindrical body 14 of the adapter which turns the winding arm, thereby winding new line 22 onto the fishing reel 20. The torque and direction of the screwdriver 16 is selected by the user.

The present invention is easily manipulated to connect a conventional battery-powered portable screwdriver 16 and most fishing reels that have winding arms, thereby eliminating the need for manual winding of line onto a fishing reel spool, saving large amounts of time.

The foregoing describes the preferred embodiment of the invention wherein the invention is constructed for use with a casting reel, however, said invention may be adapted for use with various other types of reels, including spinning reels and fly reels.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A fishing reel winding arm adapter connectable to an electric screwdriver for winding fishing line onto a fishing reel spool comprising:
   a drive member for engaging an electric screwdriver; and
   a rigid, cylindrical body that includes:
      a planar first end face having an aperture to receive said drive member; and
      a second end face having one or more recesses disposed in and on the surface of said second end face to directly engage a fishing reel winding arm for interconnecting said winding arm of a casting fishing reel to the electric screwdriver which allows the winding of line onto the spool of said fishing reel without manual manipulation of said winding arm.

2. The invention according to claim 1, wherein the aperture of the first end face is centrally located on said first end face and is threaded.

3. The invention according to claim 2, wherein said drive member is comprised of a shank with a hexagonal end portion for engaging a hexagonally-shaped chuck of the electric screwdriver, and a threaded end for engaging the cylindrical body of the adapter.

4. The invention according to claim 3, wherein said drive member includes a washer circumferentially welded on and around the shank at a point where the threading begins.

5. The invention according to claim 4, wherein the threaded end of the drive member is inserted and screwed into the threaded aperture on the planar first end face of the cylindrical body of the adapter until the washer welded to said drive member is flush with the planar surface of said first end face.

6. The invention according to claim 2, wherein the centrally-located, threaded aperture extends entirely through said cylindrical body along a central vertical axis such that the aperture begins and ends on the surfaces of the first end face and second end face, respectively, of the cylindrical body, into which said drive member is inserted.

7. The invention according to claim 3, wherein the hexagonal end portion of the shank is inserted into and engaged with the hexagonally-shaped chuck of the electric screwdriver, so that when the adapter is interconnected between the electric screwdriver and the winding arm of the fishing reel, the rotational motion of the electric screwdriver serves to spin the adapter thereby rapidly winding the winding arm of the fishing reel to load line onto the fishing reel spool.

8. The invention according to claim 1, wherein said cylindrical body of the adapter is constructed from a high carbon (polycarbon) plastic.

9. The invention according to claim 1, wherein the plurality of recesses on said second end face of the cylindrical body of the adapter include:

a shallow recess that extends across the width of said cylindrical body;

a shallow circular recessed area cut into the surface of the shallow recess; and two smaller semicircular recesses precut to the same depth and located so that said smaller recesses flank and overlap opposing sides of the larger shallow circular recess;

wherein said recesses above are sized and configured to receive the winding arm of the fishing reel.

10. The invention according to claim 9, wherein the shallow circular recess and two semicircular recesses on the second end face of the cylindrical body of the adapter fit over a nut that caps a drive shaft of the fishing reel at a point where said drive shaft connects with the winding arm of the fishing reel, thereby automatically centering and stabilizing the adapter at its point of engagement with the winding arm of said fishing reel.

11. The invention according to claim 1, wherein the recesses on the second end face of the cylindrical body are created in one more geometrical shapes so that said adapter may be used with a spinning reel and a fly reel.

12. The invention according to claim 1, wherein said drive member does not include a threaded end but is molded onto the first end face of the cylindrical body.

* * * * *